United States Patent
Tanaka

(10) Patent No.: US 7,734,300 B2
(45) Date of Patent: Jun. 8, 2010

(54) PORTABLE TELEPHONE PERFORMING A PREDETERMINED OPERATION BASED ON LOCATION INFORMATION

(75) Inventor: Shigeyuki Tanaka, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 249 days.

(21) Appl. No.: 10/498,989

(22) PCT Filed: Feb. 24, 2003

(86) PCT No.: PCT/JP03/02011

§ 371 (c)(1),
(2), (4) Date: Jun. 25, 2004

(87) PCT Pub. No.: WO03/101077

PCT Pub. Date: Dec. 4, 2003

(65) Prior Publication Data

US 2005/0176444 A1 Aug. 11, 2005

(30) Foreign Application Priority Data

May 23, 2002 (JP) ............................. 2002-149270

(51) Int. Cl.
*H04W 74/00* (2009.01)
(52) U.S. Cl. .............. 455/456.3; 455/567; 455/456; 455/404.2; 455/412.1; 455/412.2; 455/440
(58) Field of Classification Search ......... 455/456.1, 455/456.3, 456.6, 414.2, 402.2, 415, 417, 455/567, 404.2, 440, 412.2, 412.1
See application file for complete search history.

(56) References Cited

U.S. PATENT DOCUMENTS

| | | | | |
|---|---|---|---|---|
| 6,252,544 | B1 * | 6/2001 | Hoffberg | 342/357.1 |
| 6,360,101 | B1 * | 3/2002 | Irvin | 455/456.6 |
| 6,567,671 | B2 * | 5/2003 | Amin | 455/550.1 |
| 6,957,076 | B2 * | 10/2005 | Hunzinger | 455/456.3 |
| 2002/0057340 | A1 * | 5/2002 | Fernandez et al. | 348/143 |
| 2002/0090956 | A1 * | 7/2002 | Otsuka et al. | 455/456 |
| 2002/0193150 | A1 * | 12/2002 | Pritchard | 455/567 |
| 2003/0004916 | A1 * | 1/2003 | Lewis | 707/1 |
| 2003/0065805 | A1 * | 4/2003 | Barnes, Jr. | 709/231 |
| 2004/0162089 | A1 * | 8/2004 | Fan et al. | 455/456.3 |

FOREIGN PATENT DOCUMENTS

| | | |
|---|---|---|
| JP | 2000-134665 | 5/2000 |
| JP | 2000-28538 | 10/2000 |
| JP | 2000-299891 | 10/2000 |
| JP | 2001-84483 | 3/2001 |
| JP | 2001-231083 | 8/2001 |

* cited by examiner

*Primary Examiner*—Dwayne Bost
*Assistant Examiner*—Amancio Gonzalez

(57) ABSTRACT

A portable telephone comprising a GPS receiving section (17) for detecting the current position, an input section (16) having one or more key, a RAM 13 for storing a registered operating order of the keys and registered positional conditions, and a control circuit (11) for executing the operating procedure of the keys stored in the RAM (13) when a current position detected at the GPS receiving section (17) satisfies the positional conditions stored in the RAM (13), wherein the positional conditions specifies one point or the position of an area, and adds a distance exceeding the positional detection accuracy to a specified position.

2 Claims, 3 Drawing Sheets

| NO. | PATERN NAME | OPERATION SEQUENCE | LOCATION (MINIMUM DISTANCE=1m, POSITIONING PRECISION) | CONDITIONS (AND) ||||| ON/OFF SETTING |
|---|---|---|---|---|---|---|---|---|
| | | | | TRANSMISSION/RECEPTION (OR) || TIME (AND) |||
| | | | | INCOMING CALL | INCOMING MAIL | PERIOD | INTERVAL | |
| F1 | SEND VOICE | Send a given voice message to a given destination | Into 20m range from area | | | | 1 MIN | OFF |
| F2 | SEND MAIL | Send a given e-mail message to a given destination | Into 10m range from point | | | | 20 SEC | ON |
| F3 | SHOW MAIL | Show unread e-mail messages | Into 1m range from area | | | | 1 MIN | OFF |
| F4 | DOWNLOAD TIMETABLE | Show a URL to a time table | Into 10m range from point | | | | 1 MIN | OFF |
| F5 | AUDIBLE ALERT ON | Turn audible alerting on | Inside 1m range from area | IMMEDIATELY AFTER CALL FROM PARTICULAR NUMBER | | | | OFF |
| F6 | FORWARD | Forward a given e-mail message | Inside 1m range from area | AFTER CALL | AFTER RECEPTION | | | OFF |
| F7 | POWER OFF (HOSPITAL) | Turn the power off | Inside 1m range from area | | | | 20 SEC | OFF |
| F8 | VOLUME HIGH (CONSTRUCTION SITE) | Turn the volume high | Inside 1m range from area | | | JULY AUGUST | 1 MIN | OFF |
| F9 | MANNER MODE ON | Turn the manner mode on | Inside 1m range from area | | | | 1 MIN | OFF |
| F10 | MANNER MODE OFF | Turn the manner mode off | Outside 1m range from area | | | | 1 MIN | OFF |
| F11 | ALARM ON | Turn the alarm on | Into 10m range from point | | | | 20 SEC | OFF |
| F12 | ALARM OFF | Turn the alarm off | Out of 10m range from point | | | | 20 SEC | OFF |

FIG.3

| NO. | PATERN NAME | OPERATION SEQUENCE | CONDITIONS (AND) | | | | | | ON/OFF SETTING |
|---|---|---|---|---|---|---|---|---|---|
| | | | LOCATION (MINIMUM DISTANCE=1m, POSITIONING PRECISION) | TRANSMISSION/RECEPTION (OR) | | TIME (AND) | | | |
| | | | | INCOMING CALL | INCOMING MAIL | PERIOD | TIME | INTERVAL | |
| F1 | SEND VOICE | Send a given voice message to a given destination | Into 20m range from area | | | | | 1 MIN | OFF |
| F2 | SEND MAIL | Send a given e-mail message to a given destination | Into 10m range from point | | | | | 20 SEC | ON |
| F3 | SHOW MAIL | Show unread e-mail messages | Into 1m range from area | | | | | 1 MIN | OFF |
| F4 | DOWNLOAD TIMETABLE | Show a URL to a time table | Into 10m range from point | | | | | 1 MIN | OFF |
| F5 | AUDIBLE ALERT ON | Turn audible alerting on | Inside 1m range from area | IMMEDIATELY AFTER CALL FROM PARTICULAR NUMBER | | | | | OFF |
| F6 | FORWARD | Forward a given e-mail message | Inside 1m range from area | AFTER CALL | AFTER RECEPTION | | | | OFF |
| F7 | POWER OFF (HOSPITAL) | Turn the power off | Inside 1m range from area | | | | | 20 SEC | OFF |
| F8 | VOLUME HIGH (CONSTRUCTION SITE) | Turn the volume high | Inside 1m range from area | | | | JULY AUGUST | 1 MIN | OFF |
| F9 | MANNER MODE ON | Turn the manner mode on | Inside 1m range from area | | | | | 1 MIN | OFF |
| F10 | MANNER MODE OFF | Turn the manner mode off | Outside 1m range from area | | | | | 1 MIN | OFF |
| F11 | ALARM ON | Turn the alarm on | Into 10m range from point | | | | | 20 SEC | OFF |
| F12 | ALARM OFF | Turn the alarm off | Out of 10m range from point | | | | | 20 SEC | OFF |

PORTABLE TELEPHONE PERFORMING A PREDETERMINED OPERATION BASED ON LOCATION INFORMATION

CROSS-REFERENCE TO RELATED APPLICATION

This application is a National Stage entry of International Application No. PCT/JP03/02011, filed Feb. 24, 2003, the entire specification claims and drawings of which are incorporated herewith by reference.

TECHNICAL FIELD

The present invention relates to a portable telephone apparatus that can detect current location information.

BACKGROUND ART

Some conventionally known portable telephone apparatuses are capable of calculating the current location of themselves by receiving the location of a plurality of base stations, or capable of calculating the current location from the data received by a GPS (global positioning system) receiver. Correspondingly, there have been developed various ways of exploiting such current location information, as by making a portable telephone apparatus perform a predetermined operation according to its current location.

For example, Japanese Patent Application Laid-Open No. 2000-285382 discloses a portable telephone apparatus that automatically sends an electronic mail message when it reaches a predetermined location. On the other hand, Japanese Patent Application Laid-Open No. 2001-160985 discloses a system in which the current location of a portable telephone apparatus is sent to a base station, which then sends back telephone use restriction information so that, according to this information, use of the telephone in, for example, a medical facility, is prohibited.

However, these conventional portable telephone apparatuses exploit current location information simply to perform a previously determined operation, and such a capability is not very frequently used by all users. Inconveniently, this has been preventing the user of such a portable telephone apparatus from enjoying a benefit comparable to the cost of a GPS receiver.

DISCLOSURE OF THE INVENTION

An object of the present invention is to provide a portable telephone apparatus that permits the user to enjoy more benefit from it.

To achieve the above object, according to the present invention, a portable telephone apparatus is provided with a location detector for detecting the current location and a memory for storing a location condition and an operation sequence specified by the user. Here, when the current location detected by the location detector fulfills the location condition stored in the memory, the operation sequence stored in the memory is performed.

According to the present invention, the portable telephone apparatus configured as described above may be further provided with one or more operation keys so that, through operation of the operation keys, the operation sequence is stored in the memory.

According to the present invention, in the portable telephone apparatus configured as described above, the location condition can be specified either by specifying a point or area as a location or by specifying a range wider than the detection accuracy of the location detector with respect to the point or area thus specified as the location.

According to the present invention, in the portable telephone apparatus configured as described above, a transmission/reception condition for a telephone call or electronic mail message specified by the user may be stored in the memory so that, when the current location detected by the location detector fulfills the location condition and the transmission/reception condition stored in the memory, the operation sequence stored in the memory is performed.

According to the present invention, in the portable telephone apparatus configured as described above, an on/off condition specified by the user may be stored in the memory so that, when the current location detected by the location detector fulfills the location condition stored in the memory and in addition the on/off condition is on, if the current location detected by the location detector fulfills the location condition and the transmission/reception condition stored in the memory, the operation sequence stored in the memory is performed.

According to the present invention, in the portable telephone apparatus configured as described above, a time condition specified by the user may be stored in the memory so that, when the current location detected by the location detector fulfills the location condition and the time condition stored in the memory, if the current location detected by the location detector fulfills the location condition and the transmission/reception condition stored in the memory, the operation sequence stored in the memory is performed.

BRIEF DESCRIPTION OF DRAWINGS

FIG. 3 is a diagram showing examples of the automatic key operation patterns registered in the portable telephone apparatus according to the invention.

BEST MODE FOR CARRYING OUT THE INVENTION

Figure 1:
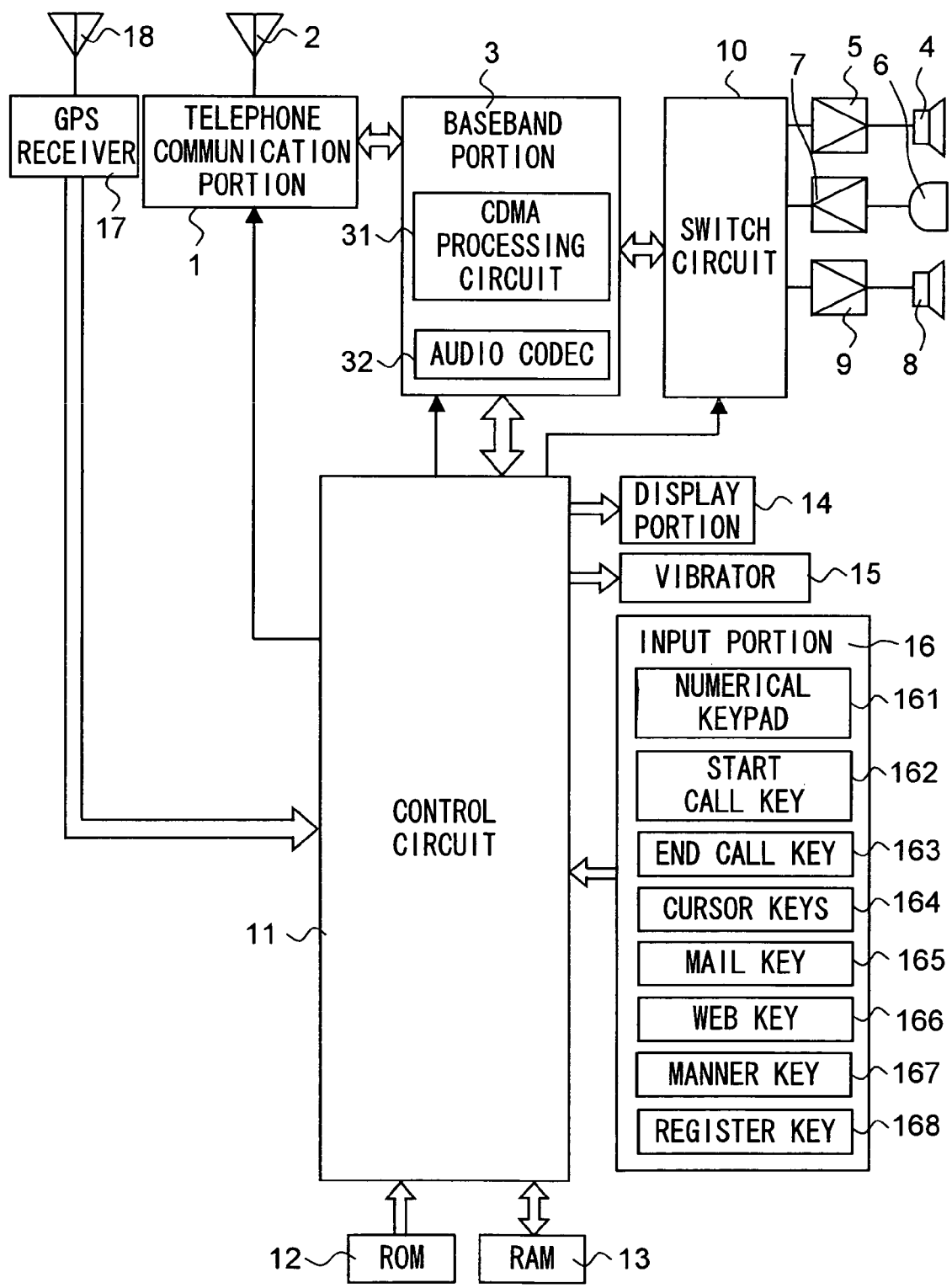
FIG. 1 is a block diagram showing the configuration of a principal portion of a portable telephone apparatus according to the invention.

Hereinafter, an embodiment of the present invention will be described with reference to the drawings. FIG. 1 is a block diagram showing the configuration of a principal portion of a portable telephone apparatus according to the invention. Reference numeral 1 represents a telephone communication portion that transmits a signal from a baseband portion 3, which will be described later, to a base station via an antenna 2 and that receives a radio wave from the base station via the antenna 2.

Reference numeral 3 represents a baseband portion having a CDMA processing circuit 31 and an audio codec 32. The CDMA processing circuit 31 performs code division multiple access, scrambling, error control, and timing detection. The audio codec 32 performs compression (encoding), decompression (decoding), and analog/digital conversion of sound, and also adjusts the volume of reproduced sound and the sensitivity of a microphone by controlling internally provided amplifier circuits (not illustrated).

Reference numeral 4 represents a loudspeaker put on an ear and used during a telephone call, which converts into sound an electrical signal output from the baseband portion 3 and amplified by an amplifier circuit 5. Reference numeral 6 represents a microphone used during a telephone call, which converts sound into an electrical signal. Reference numeral 7 represents an amplifier circuit, which amplifies the output of the microphone 6 and feeds it to the baseband portion 3.

Reference numeral 8 represents a loudspeaker for reproducing sound so loudly as to make it heard by people around. This loudspeaker 8 converts into sound an electrical signal output from the baseband portion 3 and amplified by an amplifier circuit 9. The loudspeaker 8 is used also to sound an incoming call alert.

Reference numeral 10 represents a switch circuit, which turns the connection between each of the three amplifier circuits 5, 7, and 9 and the baseband portion 3 on and off under the control of a control circuit 11, which will be described later. These three amplifier circuits 5, 7, and 9 have fixed gains, and therefore they themselves cannot adjust the volume of the reproduced sound or the sensitivity of the microphone. The volume of the reproduced sound or the sensitivity of the microphone are adjusted by the audio codec 32 of the baseband portion 3 under the control of the control circuit 11.

Reference numeral 11 represents a control circuit built around a microprocessor, which controls the individual circuit blocks according to an operation program stored in a ROM 12. Reference numeral 13 represents a RAM, in which is stored information, such as operation sequences, necessary for the operation of the control circuit 11. Reference numeral 14 represents a liquid crystal display portion, which displays a telephone number and other information. Reference numeral 15 represents a vibrator, which vibrates to alert an incoming call.

Reference numeral 16 represents an input portion, which has a numerical keypad 161, a "start call" key 162, an "end call" key 163, cursor keys 164, a "mail" key 165, a "Web" key 166, a "manner" key 167, and a "register" key 168. The numerical keypad 161 is used to enter a telephone number and other numbers. The "start call" key 162 is used to start a call. The "end call" key 163 is used to end a call. The cursor keys 164 are used to move a cursor displayed on the display portion 14 upward, downward, leftward, and rightward, respectively. The "mail" key 165, "Web" key 166, and "manner" key 167 are used to make the portable telephone apparatus operate in an electronic mail mode, an Internet mode, and a manner mode, respectively. The "register" key 168 is used to register an automatic key operation pattern.

Reference numeral 17 represents a GPS receiver, which coverts the radio wave indicating the current location received by a GPS antenna 18 into an electrical signal and then feeds it to the control circuit 11. In this embodiment, positioning is achieved by the use of DGPS (differential global positioning system) techniques, which offer a practical maximum precision of 1 m. Incidentally, KGPS (kinematic global positioning system) techniques offer a practical maximum precision of 1 cm.

Figure 2:
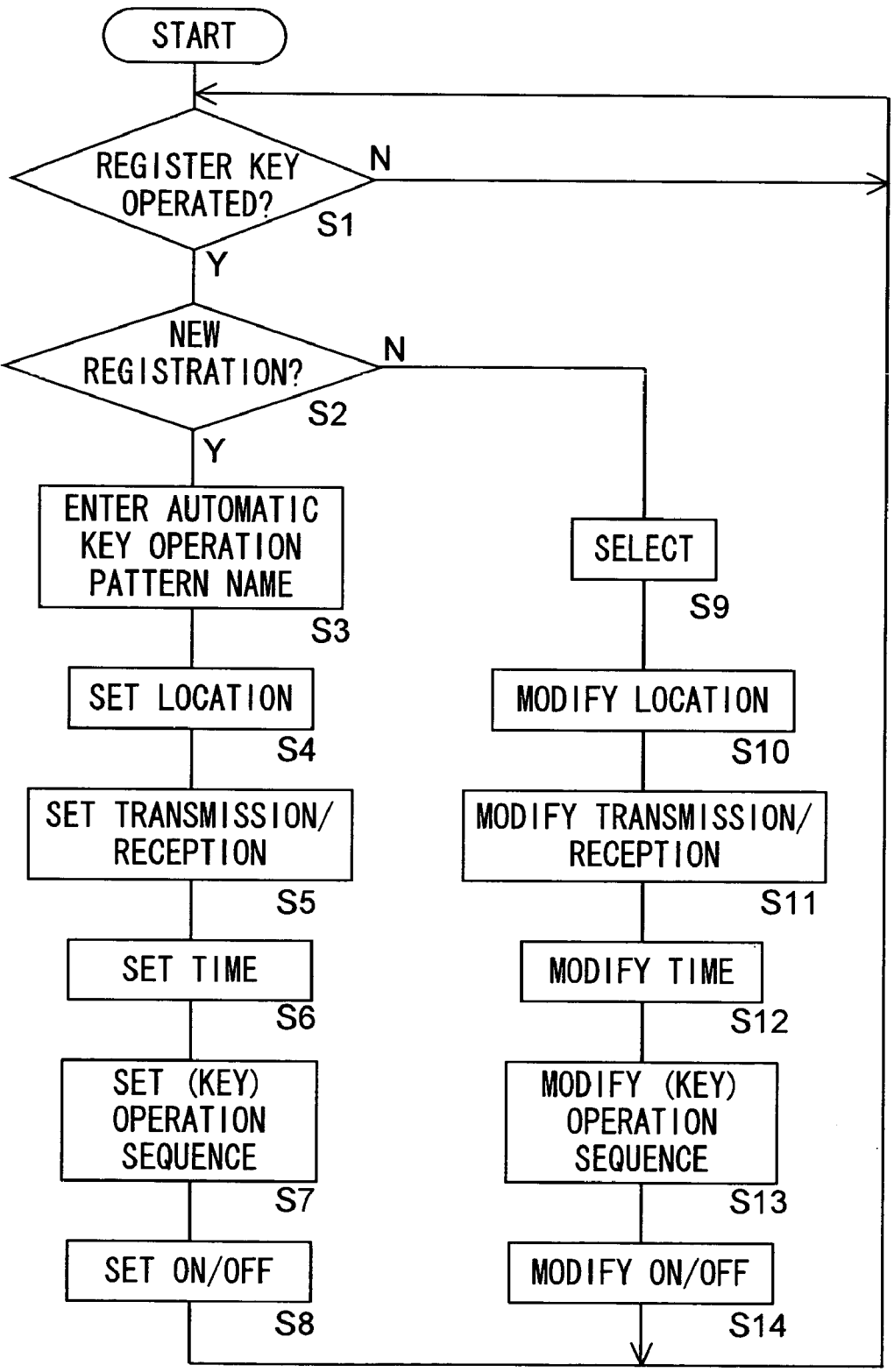
FIG. 2 is a flow chart showing the registration operation performed by the portable telephone apparatus according to the invention.

Next, how an automatic key operation pattern is registered will be described. FIG. 2 is a flow chart showing the operation of the control circuit 11. In step S1, a wait lasts until the "register" key 168 is operated. When the "register" key 168 is operated ("Y" in S1), then, in step S2, a request is made to choose between new registration and modification.

If new registration is chosen ("Y" in S2), then, in step S3, a request is made to enter the name of the new automatic operation key pattern, and the entered name is stored in the RAM 13. Then, in step S4, a request is made to enter the conditions of the target location, and the entered conditions are stored in the RAM 13. The target location may be specified as a point or area.

Additionally, a range may be specified with respect to the thus specified location, and a further specification may be made to distinguish different "relationships" between the current location and that range, namely whether the current location is currently inside the range ("inside" in FIG. 3), is currently outside the range ("outside" in FIG. 3), has just come into the range ("into" in FIG. 3), or has just gone out of the range ("out of" in FIG. 3). Here, if a given operation is set to be performed when the current location is "inside" or "outside" a certain range, that operation is constantly performed while the current location remains there. On the other hand, if a given operation is set to be performed when the current location moves "into" or "out of" a certain range, that operation is performed only when the current location moves so.

For example, a given operation may be set to be performed when the current location moves into a range of 20 m with respect to the target location, or when the current location moves out of a range of 1 m with respect to the target location. The thus specified range having a specific distance is not only for specifying the distance with reference to which to judge the movement of the current location but also for compensating for errors inevitable in positioning. Accordingly, if the user does not expressly specify the distance, it is automatically set equal to the practical maximum precision (here, 1 m) of the positioning system used.

In step S5, the control circuit 11 requests entry of transmission/reception conditions, i.e., the conditions under which to originate or receive a telephone call or electronic mail message, and stores the entered conditions in the RAM 13. While entry of the conditions of the target locations is obligatory, that of transmission/reception conditions may be omitted. The transmission/reception conditions for a telephone call and those for an electronic mail message are logically added (i.e., the OR of those conditions is calculated).

In step S6, the control circuit 11 requests entry of time conditions, i.e., conditions relating to the period during which and the time interval at which to check the specified conditions, and stores the entered conditions in the RAM 13. The period may be specified with the dates or hours that demarcate it. For example, in a case where the period is set to be through July and August and the time interval is set to be 20 seconds, the control circuit 11 checks the specified conditions every 20 minutes only through July and August and, if the conditions are fulfilled, it automatically performs the specified operation sequence. If no time conditions are entered, the conditions are checked all the time.

In step S7, the control circuit 11 requests entry of an operation sequence, and stores the entered operation sequence in the RAM 13. The operation sequence is entered through actual operation of keys, and this entry of the operation sequence is terminated when the "register" key 168 is operated.

In step S8, the control circuit 11 requests setting of whether to turn on or off automatic key operation, and stores the specified setting in the RAM 13. The flow then returns to step S1. The location conditions, transmission/reception conditions, time conditions, and on/off condition thus specified are logically multiplied (i.e., the AND of those conditions is calculated). Since the location conditions often relate to the timing with which, the hour at which, and the situation in which transmission/reception is performed, combining the location conditions with the transmission/reception conditions, time conditions, and on/off condition makes it possible to specify detailed conditions.

In step S2, if modification is chosen ("N" in S2), the flow proceeds to step S9. In step S9, the control circuit 11 requests selection of the name of one among the registered automatic key operation patterns which is going to be modified. Next, in step S10 through S14, the control circuit 11 requests modifications to the settings made in steps S4 to S8 described above, and then stores the modified settings in the RAM 13.

When the conditions specified through registration of the automatic key operation pattern in the manner described above are fulfilled, the control circuit 11 automatically performs the specified operation sequence.

FIG. 3 is a diagram showing practical examples (number F1 to F12) of registered patterns, of which some will be described below. For the pattern registered under the number F1, in step S3, "send voice" is entered as the name of the automatic key operation pattern, and this name is stored in the RAM 13. In step S4, a plurality of points, a distance "20 m," and the relationship "into" are entered, and thus "into the range of 20 m from the area enclosed by the points" is stored as the position conditions in the RAM 13.

Step S5 is skipped, with no transmission/reception conditions entered. In step S6, a time interval "one minute" is entered as the time condition. In step S7, an operation sequence is entered by performing the following operations: an operation of selecting a voice message saying "I have just arrived at the amusement park and I want you to come here" from a list of voice messages, an operation of selecting, as a destination to which to send the message, a particular telephone number from the telephone directory, and an operation of originating a call to send it. Then, the "register" key 168 (see FIG. 1) is operated so that this operation sequence, except for the operation of the "register" key 168, is stored. In step S8, "off" is chosen as the on/off condition, and this is stored in the RAM 13.

When the on/off condition for the pattern F1 is "on," whether or not the current location has come into the range of 20 m from the specified area is checked every one minute so that, when the range is reached, a call is automatically originated to the particular telephone number to automatically send the voice message "I have just arrived at the amusement park and I want you to come here" a predetermined number of times. In this way, it is possible to send a voice message automatically when a particular location is reached.

For the pattern registered under the number F2, in step S3, "send e-mail" is entered as the name of the automatic key operation pattern. In step S4, a point, a distance "10 m," and the relationship "into" are entered, and thus "into the range of 10 m from the point" is stored as the position conditions in the RAM 13. Step S5 is skipped, with no transmission/reception conditions entered.

In step S6, a time interval "20 seconds" is entered as the time condition. In step S7, an operation sequence is entered by performing an operation of sending an e-mail message saying "I have now arrived at the station. It is raining, so I want you to pick me up" to a particular electronic mail address, and then the "register" key 168 is operated. In a rainy or other unfavorable weather, in step S8, "on" is chosen as the on/off condition.

Thus, when the on/off condition for the pattern F2 is "on," as soon as the current location comes into the range of 10 m from the specified point, the electronic mail message "I have now arrived at the station. It is raining, so I want you to pick me up" is sent.

For the pattern registered under the number F5, in step S3, "audible alert on" is entered as the name of the automatic key operation pattern. In step S4, a plurality of points, a distance "1 m," and the relationship "inside" are entered, and thus "inside the range of 1 m from the area enclosed by the points" is stored as the position conditions in the RAM 13.

In step S5, as the transmission/reception conditions, a particular telephone number is entered, and a relationship "immediately after receiving a call from the telephone number" is selected, and these conditions are stored in the RAM 13. In step S6, no time conditions are entered so that checking is performed all the time. In step S7, an operation sequence is entered by performing an operation of turning audible alerting on, and then the "register" key 168 is operated. In step S8, "off" is chosen as the on/off condition.

When the on/off condition for the pattern F5 is "on," if a call is received from the telephone number of the particular caller while the current location is inside the specified range, audible alerting is turned from off to on to audibly alert the call. For example, even during a meeting, it is possible to audibly alert an incoming call from a particular caller. In this way, it is possible to combine position conditions with transmission/reception conditions.

For the pattern registered under the number F8, in step S3, "volume high (construction site)" is entered as the name of the automatic key operation pattern. In step S4, a plurality of points defining the area of a construction site, a distance "1 m," and the relationship "inside" are entered, and thus "inside the range of 1 m from the construction site" is stored as the position conditions in the RAM 13.

Step S5 is skipped, with no transmission/reception conditions entered. In step S6, as the time conditions are entered the period of the construction work, for example through July and August, and a time interval "one minute." In step S7, an operation sequence is entered by performing an operation of turning the volume high, and then the "register" key 168 is operated. In step S8, "off" is chosen as the on/off condition.

When the on/off condition for the pattern F8 is "on," during the period of the construction work, i.e., through July and August, whether or not the current location is at the construction site is checked every one minute so that, if so, the volume of audible alerting is turned high. In this way, it is possible to combine position conditions with a period.

In this embodiment, an operation sequence performed by the user through key operation is stored and registered in the RAM 13 so that the same operation sequence will be performed later. However, an operation sequence may be registered in any other manner. For example, the user may be permitted to select desired operations from the previously prepared list of all the operations of the portable telephone apparatus and store them in the RAM 13 so that they will be performed later. The current location may be detected by any other means than by the use of GPS. For example, the portable telephone apparatus may receive information on its current location from nearby base stations or beacons.

INDUSTRIAL APPLICABILITY

According to the present invention, when a set of registered location conditions are fulfilled, an operation sequence registered through key operation or the like is performed. This permits the user to register and automatically perform various operation sequences that suit specified locations, and thus enhances convenience to the user. By adding a distance greater than the positioning precision to the specified location, it is possible to specify location conditions with consideration given to the positioning precision.

Location conditions may relate to the timing with which, the hour at which, and the situation in which transmission/reception is performed. For example, there are cases such as one in which a call from a particular caller is being waited for in a meeting room, one in which the user is at a construction site during the construction period, and one in which the user wants someone to pick him up when it is raining. By combining location conditions with transmission/reception conditions, time conditions, and an on/off condition, it is possible to specify detailed conditions.

The invention claimed is:

1. A portable telephone apparatus comprising:
a location detector for detecting movement of a portable telephone from outside a predetermined area into the predetermined area;
an input portion for accepting input, by a user, of the predetermined area, of an e-mail message, and of a date/time condition that determines when the location detector performs detection;
a time keeper for keeping a current date and time;
a memory for storing at least the e-mail message and the date/time condition in a pair; and
a transmitter for sending the e-mail message stored in the memory to a predetermined addressee,
wherein when the date/time condition is fulfilled, the location detector performs detection within a period specified by the date/time condition and, if the date/time condition has not been entered, the location detector performs detection continuously so that, when the location detector detects movement of the portable telephone from outside the predetermined area into the predetermined area, the e-mail message is read out from the memory and is sent by the transmitter.

2. A portable telephone apparatus comprising:
a current location detector for detecting a current location of a portable telephone;
an input portion for accepting input, by a user, of a predetermined area, of an e-mail message, and of a date/time condition that determines when the location detector performs detection;
a time keeper for keeping a current date and time;
a memory for storing at least the e-mail message, the predetermined area, and the date/time condition in a set; and
a transmitter for sending the e-mail message stored in the memory to a predetermined addressee,
wherein when the date/time condition is fulfilled, the location detector performs detection within a period specified by the date/time condition and, if the date/time condition has not been entered, the location detector performs detection continuously so that, when the current location is detected as having moved into the predetermined area stored in the memory, the e-mail message is read out from the memory and is sent by the transmitter.

* * * * *